United States Patent [19]

Eusterbarkey

[11] 4,334,789
[45] Jun. 15, 1982

[54] MIXING AND KNEADING TOOL

[75] Inventor: Friedhelm Eusterbarkey, Bad Pyrmont, Fed. Rep. of Germany

[73] Assignee: A. Stephan u. Söhne GmbH & Co., Hameln, Fed. Rep. of Germany

[21] Appl. No.: 141,566

[22] Filed: Apr. 18, 1980

Related U.S. Application Data

[63] Continuation of Ser. No. 19,433, Mar. 12, 1979, abandoned.

[30] Foreign Application Priority Data

Oct. 5, 1978 [DE] Fed. Rep. of Germany ....... 2843369

[51] Int. Cl.$^3$ .............................................. B01F 7/32
[52] U.S. Cl. ..................................... 366/343; 366/69; 366/98
[58] Field of Search ................... 366/343, 342, 69, 70, 366/72, 94, 95, 96, 97, 98, 99, 289, 279, 344, 320

[56] References Cited

U.S. PATENT DOCUMENTS

| 850,991 | 4/1907 | Abbott | 366/98 |
| 1,036,489 | 8/1912 | Hall | 366/98 |
| 1,062,201 | 5/1913 | Stiriz | 366/97 |
| 2,240,237 | 4/1941 | Anderson | 366/343 |
| 2,306,245 | 12/1942 | Duke | 366/98 |

Primary Examiner—Robert W. Jenkins
Attorney, Agent, or Firm—Michael J. Striker

[57] ABSTRACT

A mixing and kneading tool for a motor-driven shaft of a mixing and kneading machine has two blades having a common axis of rotation and located adjacent to one another in an axial direction. The blades are offset relative to one another in a direction of rotation by an angle equal to substantially 180°. The blades together have a shape, as considered in a direction transverse to the axis, which substantially corresponds to the curve of a full period sine function. The blades may be mounted on a sleeve-shaped supporting member which can be fitted over the shaft of the machine. The blades together have a contour resembling a seemingly closed curve, as considered in the axial direction.

10 Claims, 3 Drawing Figures

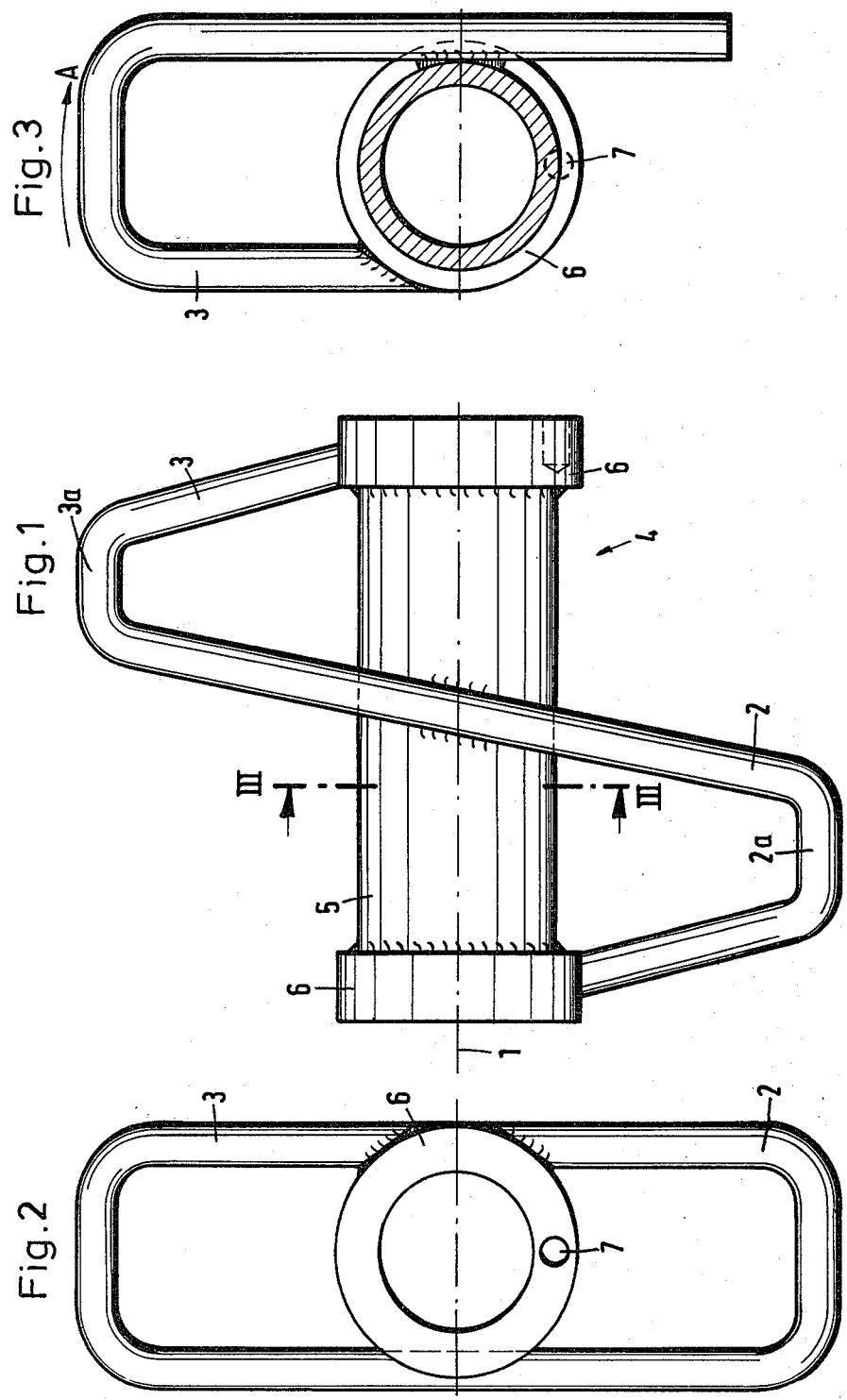

MIXING AND KNEADING TOOL

This is a continuation of application Ser. No. 019,433, filed Mar. 12, 1979, now abandoned.

BACKGROUND OF THE INVENTION

The present invention relates to a mixing and kneading tool for a motor-driven shaft which extends into a mixing and kneading container, particularly of a high-speed dough kneading machine.

Mixing and kneading tools of the above-mentioned general type are known in the art. Some of such tools are described in the German Pat. No. 1,166,715 and No. 1,189,483 and in the German Offenlegungsschrift No. 2434330. These tools have a slightly sickle-like shape, as considered in a plan view, and a cross-section which increases in the direction of rotation. The above-described tools have been utilized in practice to a great extent during the past fifteen years.

By conducting experiments of the operation of such tools, it was recognized that when these tools are utilized, the friction component is relatively high as compared with the kneading component of the process. This is disadvantageous, particularly for some types of dough which must be manufactured so as not to exceed certain predetermined final temperatures.

SUMMARY OF THE INVENTION

Accordingly, it is an object of the present invention to provide a mixing and kneading tool which avoids the disadvantages of the prior art.

More particularly, it is an object of the present invention to provide a mixing and kneading tool which not only performs good mixing of dough components, but also assures an optimum kneading action with only small temperature increase in the dough.

In keeping with these objects and with others which will become apparent hereinafter, one feature of the present invention resides, briefly stated, in a mixing and kneading tool which has two blades rotatable about a common axis and located adjacent to one another in an axial direction, the blades being offset relative to one another in the direction of rotation by an angle which is equal to substantially 180° and together having a shape, as considered in the axial direction, which substantially corresponds to the shape of a full period sine function. The blades are located at radially opposite sides of the axis of rotation of the tool.

In accordance with another feature of the present invention the blades have flattened portions in the regions corresponding to the apices of the sine curve. In such a construction each blade has a substantially trapeze-like shape. The above-mentioned portions of the blades may extend substantially parallel to the axis of rotation of the tool.

Still another feature of the present invention is that the blades may together form a seemingly closed contour, as considered in the axial direction. The closed contour may correspond to a flattened oval or a flat rectangle. However, the blades are not located in a common longitudinal plane extending through the axis of rotation. The blades are twisted in the axial direction so that when a particular inclination is selected, the material can be conveyed in one or another axial direction.

The inventive mixing and kneading tool moves the material not only in the radial direction, but also in a respective one of the axial directions in dependence upon the inclination of the blades. In other words, the material can be moved toward the bottom or the top of a mixing and kneading container of the dough kneading machine. The new tool operates in an optimum manner when the shaft of the machine extends in a horizontal direction and thereby the mixing and kneading container is in lying position. Since the tool has a small outer surface, the dough is subjected to only small friction but is strongly moved and thereby kneaded.

In accordance with a further feature of the present invention, the blades are of one piece with one another and together form an integral member which is constituted by a rod-like material, e.g. bar steel. The rod-like material has advantageously a round cross-section. When the tool is so constructed, the friction is especially low. As a result of this, dough can be manufactured which is 20% cooler than the dough manufactured with the use of conventional tools. Such cooler dough can be especially easily worked by machines in subsequent steps of the manufacturing process, and the final baked products can be produced with uniform pores. Taking into consideration that up to now the water called for in the recipe had to be specially precooled in order to prevent cooking of the dough during the mixing process, the utilization of the invention will be seen not only to improve the quality of the baked products but will also considerably reduce energy consumption, since no pre-cooling of the water is required.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a side view of a mixing and kneading tool in accordance with the present invention;

FIG. 2 is an axial view of the tool shown in FIG. 1; and

FIG. 3 is a view showing a section of the tool along the line III—III in FIG. 1.

DESCRIPTION OF A PREFERRED EMBODIMENT

A mixing and kneading tool in accordance with the present invention is arranged to be connected with a shaft which extends in a mixing and kneading container, particularly of a high-speed dough kneading machine. The machine, as well as the container and the shaft, are known per se in the art and not shown in the drawing. The tool is rotatable about an axis of rotation which is identified by reference numeral 1.

As can be seen particularly from FIG. 2, the tool has two blades 2 and 3 in the form of substantially U-shaped loops which are located opposite to one another and one after the other, as considered in the axial direction. The blades 2 and 3 are offset relative to one another in the direction of rotation by an angle which is substantially equal to 180°. When the tool is viewed in a lateral direction, that is in a direction which is transverse to the axis of rotation, the blades 2 and 3 together have a shape which substantially corresponds to the curve of a sine function with a full period. The blade 3 is located above the axis of rotation 1, whereas the blade 2 is located below the latter, as considered in FIG. 1.

Each of the blades has lateral arms and an apex portion 2a and 3a, respectively, which correspond to a respective one of the apices of the sine curve. These portions 2a and 3a are somewhat flattened and correspond in length substantially to the diameter of a supporting member 4. They may extend parallel to the each other so that each blade forms a trapeze. As can be seen particularly from FIG. 2, the blades, when considered in the direction of the axis 1, together have a seemingly closed curved contour. This contour may correspond to a slightly flatted oval or a flat rectangle. The latter is shown in FIG. 2.

The loop-like blades 2 and 3 are constituted by a rod-like material, such as e.g. bar or rod steel. Such a material may have a round cross-section. The blades 2 and 3 are preferably made of one piece steel rod so as to form an integral member. The tool is further provided with a supporting member 4 for supporting the above-described blades 2 and 3. The ends of lateral arms of the blades are rigidly connected with the supporting member 4, for example, by welding.

The supporting member 4 is formed as a sleeve 5 which can be fitted over the not shown shaft of the dough kneading machine. Two end rings 6 are mounted on the ends of the sleeve 5. The blades are so welded to the supporting member that their proximal ends are welded to the sleeve 5 approximately midway between the rings 6 whereas their distal ends are welded to the end rings 6.

The distal ends and the proximal ends of the blades are welded to the supporting member 5 and to the rings 6 at diametrically opposite locations.

At least one end ring has a pin hole 7 into which a locking pin can be inserted so as to provide a joint rotation of the tool with the not shown shaft of the dough kneading machine.

It will be understood that each of the elements described above, or two or more together, may also find a useful application in other types of constructions differing from the types described above.

While the invention has been illustrated and described as embodied in a mixing and kneading tool, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A blade adapted for use on a driving shaft which rotates around an axis, the blade being further adapted for mixing and kneading dough and the like, comprising: an element with a first end and a second end, the element being shaped such that the element defines a continuous curve having a first loop and a second loop, and which extends around the axis of the shaft in a manner that an imaginary straight line segment connecting the ends is parallel to the axis, the first loop and the second loop are mirror images of each other and are serially connected to each other between the first end and the second end, and wherein the curve, as viewed normal to the axis, traces out a generally sinusoidal projection of period equal to the straight line segment with the loops approximately apices of the sinusoid, and wherein the curve, as viewed along the axis, traces out an elongated generally rectangular projection, the projection having rounded ends.

2. A mixing and kneading tool for use in connection with a rotary shaft of a power-driven kneading machine, comprising a supporting cylindrical member attachable to said shaft and defining on its surface two axially spaced end points and a middle point located between and being diametrically opposed to said end points; two diametrically opposed kneading blades secured to said supporting member and each having the form of a substantially U-shaped loop member of a rigid rod-like material, one end of each loop being attached at said middle point and the other ends of the loops being attached at respective end points on said supporting member.

3. A tool as defined in claim 2, wherein each loop defines two lateral arms and an apex portion, the length of said apex portion corresponding substantially to the diameter of said supporting member.

4. A tool as defined in claim 3, wherein at least a central part of the apex portion of respective loops has a straight configuration.

5. A tool as defined in claim 4, wherein the straight parts of the apex portions extend parallel to each other and in a transverse direction relative to the axis of said supporting member.

6. A tool as defined in claim 5, wherein the arms of said loops that are attached to said middle point are in alignment with each other.

7. A tool as defined in claim 6, wherein the other arms extend parallel to each other.

8. A tool as defined in claim 7, wherein said loops are shaped of a single piece rod-like material.

9. A tool as defined in claim 4, wherein the end parts of said apex portions are rounded.

10. A tool as defined in claim 2, wherein said supporting member is in the form of a sleeve having two axially spaced end rings, and said end points being located on said end rings.

* * * * *